3,426,033
DI-($R_1$—$R_2$-HYDROXYMETHYL)-CYCLOPENTADIENES

Joseph A. Meschino, North Wales, Pa., assignor to McNeil Laboratories, Incorporated, a corporation of Pennsylvania
No Drawing. Filed Feb. 24, 1966, Ser. No. 529,675
U.S. Cl. 260—296          7 Claims
Int. Cl. C07d 31/20

ABSTRACT OF THE DISCLOSURE

The compounds are of the class of di-substituted cyclopentadienes which are useful as ultra-violet light absorbers This invention relates to novel organic compounds and to the preparation thereof. More particularly, this invention relates to $R_1$—$R_2$-hydroxymethyl substituted cyclopentadiene having a second $R_1$—$R_2$-hydroxymethyl substituent on a ring carbon atom one removed from the ring carbon atom bearing the first $R_1$—$R_2$-hydroxymethyl substituent. In these disubstituted cyclopentadienes, wherein the two $R_1$—$R_2$-hydroxymethyl substituents are attached to ring carbon atoms separated by an unsubstituted ring carbon atom, $R_1$ and $R_2$ are each a member selected from the group consisting of pyridyl and lower alkyl-pyridyl. As used herein, lower alkyl includes straight and branched saturated aliphatic chains, such as methyl, ethyl isopropyl, butyl, secondary-butyl and the like.

The subject compounds absorb ultra-violet (U.V.) light and can be employed as effective U.V. screens when incorporated in suitable vehicles such as transparent film-forming compositions and oils.

The subject compounds may be advantageously prepared by treating an appropriate $R_1$—CO—$R_2$ ketone with cyclopentadiene, preferably in the ratio of 2 moles to 1, in the presence of an alkali metal lower alkoxide in a lower alkanol solvent, preferably sodium ethoxide and ethanol, respectively. Temperatures from −30° C. to 30° C. may be utilized although reduced temperatures from −15° C. to 10° C. are preferred. A catalytic amount of the alkali metal lower alkoxide is generally all that is required, although from 0.01 to 0.1 mole of alkoxide per mole of ketonic reagent is preferred and up to 0.5 mole may be advantageously utilized.

Due to the known double bond isomerization of the cyclopentadienyl ring nucleus in substituted cyclopentadienes, it is evident that the existence of the subject compounds as more than one double bond isomer is possible, and, accordingly, it is intended that all such isomers be included within the scope of this invention. Thus, the product obtained from the above-described reaction results in a mixture of double-bond isomers of the subject di-($R_1$—$R_2$-hydroxymethyl)-cyclopentadiene which as evidenced by nuclear magnetic resonance (n.m.r.) spectroscopy, generally comprises 1,4-di-($R_1$—$R_2$-hydroxymethyl)-cyclopenta-1,3-diene and 1,3-di-($R_1$—$R_2$-hydroxymethyl)-cyclopenta-1,3-diene, which can generally be separated by conventional techniques such as fractional crystallization.

The following examples are intended to illustrate, but not to limit, the scope of the present invention.

Example I

A stirred solution of 18.4 grams of di-(2-pyridyl)-ketone in 150 ml. of absolute ethanol containing about 0.1 g. of sodium ethoxide is cooled to −10° C. and treated with 3.6 g. of cyclopentadiene so that the temperature does not exceed 0° C. After about 3 hours, the resulting precipitate is filtered and air-dried to give 20 g. of the isomeric mixture, M.P. 120–123° C. From nuclear magnetic resonance (n.m.r.) spectroscopy, the mixture is found to be predominantly composed of 1,4-di-[di-(2-pyridyl)-hydroxymethyl]-cyclopenta-1,3-diene and 1,3-di-[di-(2-pyridyl)-hydroxymethyl] - cyclopenta - 1,3 - diene (3:1 ratio).

*Analysis.*—Calc. for $C_{27}H_{22}N_4O_2$: C, 74.63; H, 5.10; N, 12.90%. Found: C, 74.57; H, 5.21; N, 12.77%.

Example II

A 10 g. sample of the mixture obtained from Example I is dissolved in about 30 ml. of boiling methylene chloride after which 60 ml. of petroleum ether is added. A product precipitates at ambient temperature (M.P. 126–129° C.), on which the foregoing process is repeated twice to yield a product (M.P. 133–135° C.) which is shown to be greater than 90% 1,4-di-[di - (2 - pyridyl) - hydroxy methyl]-cyclopenta-1,3-diene by n.m.r. analysis.

Example III

The procedure of Example I is followed except that an equivalent quantity of di-(4-pyridyl)-ketone is used in place of the di-(2-pyridyl)-ketone used therein to yield, as the respective product, an isomeric mixture of predominantly 1,4-di-[di-(4-pyridyl) - hydroxymethyl]cyclopenta-1,3-diene and 1,3-di-[di-(4-pyridyl) - hydroxymethyl]-cyclopenta-1,3-diene, M.P. 126-134° C.

Example IV

By using an equivalent quantity of di-(6 - methyl - 2-pyridyl)-ketone for the di-(2-pyridyl)-ketone in the procedure of Example I, an isomeric mixture of predominantly 1,4-di-[di-(6-methyl-2-pyridyl)-hydroxymethyl]-cyclopenta - 1,3 - diene and 1,3-di - [di - (6-methyl-2-pyridyl)-hydroymethyl] - cyclopenta - 1,3 - diene is obtained, M.P. 147.5–149.5° C.

Example V

The procedure of Example I is followed except that an equivalent quantity of 2-pyridyl-4-pyridyl ketone is used in place of the di-(2-pyridyl)-ketone used therein to yield, as the respective product, and isomeric mixture of predominantly 1,4 - di-(2-pyridyl-4-pyridyl-hydroxymethyl)-cyclopenta-1,3 - diene and 1,3 - di - (2-pyridyl-4-pyridyl-hydroxymethyl)-cyclopenta-1,3-diene, M.P. 156–158° C.

What is claimed is:

1. Di - ($R_1$—$R_2$ - hydroxymethyl) - cyclopentadiene, wherein $R_1$ and $R_2$ are each a member selected from the group consisting of pyridyl and lower alkyl-pyridyl, said pyridyl being 2-pyridyl or 4-pyridyl, and the two $R_1$—$R_2$-hydroxymethyl substituents are attached to ring carbon atoms separated by an unsubstituted ring carbon atom.

2. The compound of claim 1 wherein $R_1$ and $R_2$ are each 2-pyridyl.

3. The compound of claim 1 wherein $R_1$ and $R_2$ are each 4-pyridyl.

4. The compound of claim 1 wherein $R_1$ and $R_2$ are each 6-methyl-2-pyridyl.

5. The compound of claim 1 wherein $R_1$ is 2-pyridyl and $R_2$ is 4-pyridyl.

6. The method of preparing di - ($R_1$—$R_2$ - hydroxymethyl)-cyclopentadiene, wherein $R_1$ and $R_2$ are each a member selected from the group consisting of pyridyl and lower alkyl - pyridyl, said pyridyl being 2 - pyridyl or 4-pyridyl, and the two $R_1$—$R_2$-hydroxymethyl substituents are attached to ring carbon atoms separated by an unsubstituted ring carbon atom, which comprises reacting an $R_1$—CO—$R_2$ ketone with cyclopentadiene in the presence of a catalytic amount of an alkali metal lower alkoxide in a lower alkanol at a temperature of about −30° C. to 30° C.

7. The method of claim 6 wherein the alkali metal lower alkoxide is sodium ethoxide and the lower alkanol is ethanol.

References Cited

FOREIGN PATENTS 660,853  9/1965  Belgium.

HENRY R. JILES, *Primary Examiner.*

A. L. ROTMAN, *Assistant Examiner.*

U.S. Cl. X.R.

260—45.8